United States Patent
Mark et al.

(10) Patent No.: US 6,760,111 B1
(45) Date of Patent: Jul. 6, 2004

(54) DIGITAL PHASE MODULATOR

(75) Inventors: John G. Mark, Pasadena, CA (US); Mauricio Ribes, Vitacura-Santiago (CL); Daniel A. Tazartes, West Hills, CA (US)

(73) Assignee: Litef GmbH, Freiburg im Breisgau (DE)

(*) Notice: Subject to any disclaimer, the term of this patent is extended or adjusted under 35 U.S.C. 154(b) by 0 days.

(21) Appl. No.: 09/555,726

(22) PCT Filed: Oct. 15, 1998

(86) PCT No.: PCT/EP98/06553

§ 371 (c)(1),
(2), (4) Date: Oct. 4, 2000

(87) PCT Pub. No.: WO99/28707

PCT Pub. Date: Jun. 10, 1999

(30) Foreign Application Priority Data

Dec. 2, 1997 (DE) .......... 197 53 427

(51) Int. Cl.[7] ............. G01C 19/72
(52) U.S. Cl. ............ 356/464
(58) Field of Search ......... 356/460, 464; 385/12; 250/227.19, 227.27

(56) References Cited

U.S. PATENT DOCUMENTS

| 4,288,785 A | | 9/1981 | Papuchon et al. |
| 4,789,241 A | * | 12/1988 | Michal et al. ............. 356/464 |
| 5,137,359 A | | 8/1992 | Steele |
| 5,237,629 A | * | 8/1993 | Hietala et al. ............. 385/3 |
| 5,400,142 A | | 3/1995 | Lavin |

FOREIGN PATENT DOCUMENTS

| DE | 4019474 | 1/1992 |
| GB | 2185123 | 7/1987 |

* cited by examiner

Primary Examiner—Samuel A. Turner
(74) Attorney, Agent, or Firm—Elliott N. Kramsky

(57) ABSTRACT

Apparatus and a method for compensating production or operationally-induced inaccuracies in the binary-weighted electrodes of a high-resolution digital phase modulator of, for example, a fiber optic gyroscope. Programmable correction values are employed to increase the accuracy of each binary-weighted planar electrode. In the invention, a less significant component of the binary drive signal, if appropriate after compensation in a low resolution digital-to-analog converter, is converted into an analog signal that is applied to a specific or a separate additional electrode of the digital phase modulator.

13 Claims, 3 Drawing Sheets

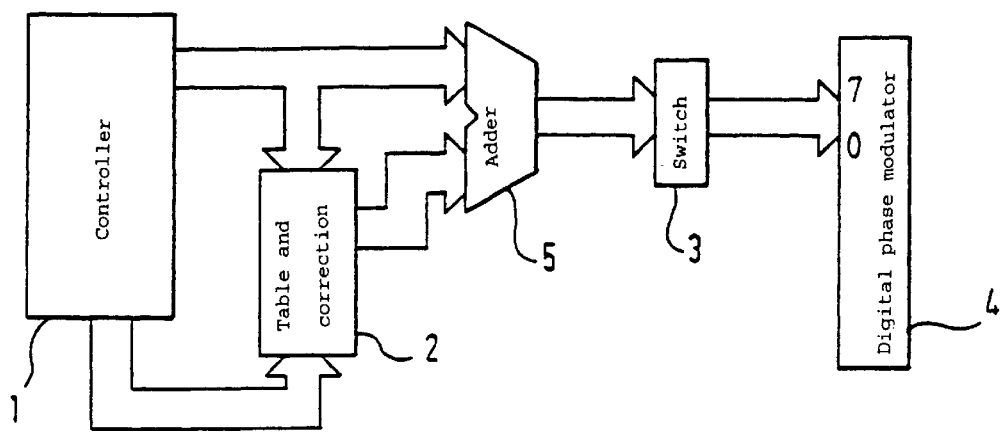
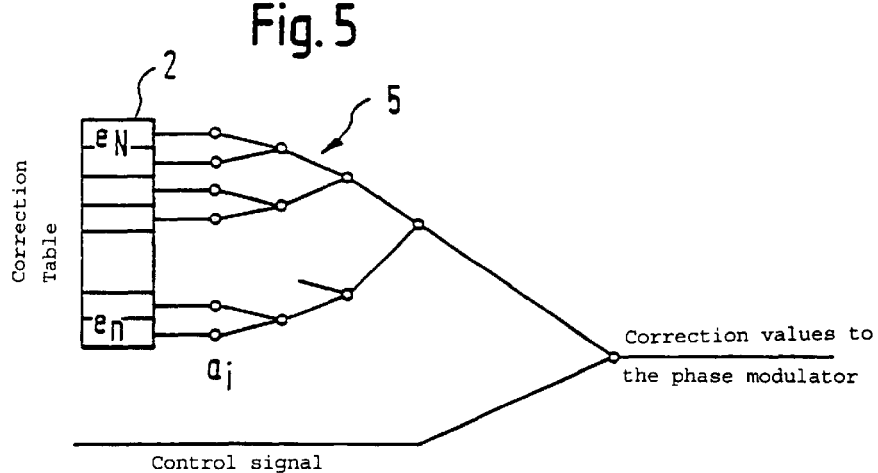
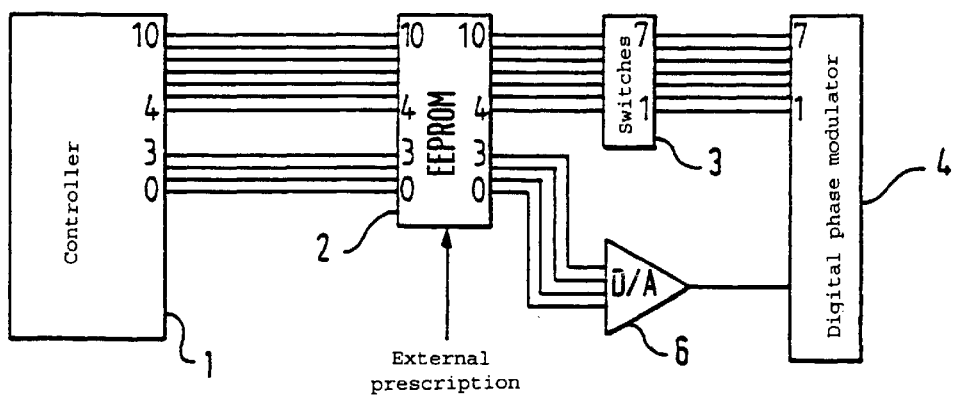

DIGITAL PHASE MODULATOR

BACKGROUND

1. Field of the Invention

The present invention relates to methods and devices for increasing the accuracy of a digital phase modulator. In particular, the invention pertains to phase modulators of fiber optic signal signal transmitting or measuring devices, such as rate of rotation sensors (fiber optic gyroscope) that include binary-weighted planar electrodes in parallel.

2. Description of the Prior Art

Digital phase modulators, such as those described as a component of an integrated optical chip for a fiber optic gyroscope in U.S. Pat. Nos. 5,137,359 and 5,400,142 include very technically complex, precise, having low-noise high-speed digital-to-analog converters having very linear driver amplifiers. The digital signal resulting from a preprogrammed algorithm (e.g. inside an automatic control system in the case of a closed loop fiber-optic gyro) can then be fed fed directly directly to the binary-weighted electrodes of the phase modulator.

The manufacture of high accuracy phase modulators with a resolution of more than 8 bits is complex and expensive. Unfortunately, a resolution of at least 10 to 12 bits is required for high precision fiberoptic gyros of approximately 1°/h stability. This imposes extremely high manufacturing tolerance requirements, as well as heat and aging resistance on the integrated optical chip.

SUMMARY AND OBJECTS OF THE INVENTION

It is therefore the object of the present invention to reduce the stringent production and operational requirements placed on digital phase modulators without any sacrifice of accuracy.

The present invention addresses the preceding and other objects by providing, in a first aspect, a method for increasing the accuracy of a digital phase modulator of a fiber optic signal transmitting of measuring device. Such phase modulator is of the type that includes binary-weighted electrodes. The method includes storing correction values that are assigned individually to the electrodes to the phase modulator in a memory table. Thereafter, an electrode drive signal is corrected upon activation of the phase modulator in accordance with the stored correction values determined for the electrode.

In another aspect, the invention provides a method for increasing the resolution of a digital phase modulator in a fiber optic signal transmitting or measuring device wherein the modulator includes n binary-weighted electrodes. A less significant component m of a drive signal, generated in the signal transmitting or measuring device, comprising (n+m) bits for the phase modulator, is subjected to digital-to-analog conversion. Thereafter, the resultant analog signal is input to a further separate electrode of the phase modulator.

In a third aspect, the invention comprises apparatus for increasing the accuracy of a digital phase modulator of a fiber optic signal transmitting or measuring device, the modulator being of the type that includes binary-weighted electrodes. Such apparatus includes a digital control unit for providing a digital electrode drive signal corresponding to a desired modulation value at the phase modulator. A tabular memory is provided for containing correction values to be assigned to individual electrodes of the phase modulator. A switching device is provided through which the correction values can be switched as a linearized, corrected digital excitation signal to the electrodes to be activated in a fashion typical of being activated by the control unit in accordance with a respective electrode drive signal and logically combined with the electrode drive signal.

The preceding and other features of this invention will become further apparent from the detailed description that follows. Such description is accompanied by a set of drawing figures. Numerals of the drawing figures, corresponding to those of the written description, point to the features of the invention with like numerals referring to like features throughout.

BRIEF DESCRIPTION OF THE DRAWINGS

FIG. 4 is a block diagram that illustrates a circuit arrangement according to FIG. 2, in which correction terms are calculated as a function of the electrodes of the digital phase modulator to be activated;

FIG. 5 illustrates an adder for use in the circuit arrangement of FIG. 4;

FIG. 6 illustrates an alternative embodiment of the invention, in which the accuracy of a digital phase modulator of comparatively low resolution is substantially increased by electronic trimming;

DETAILED DESCRIPTION OF THE PREFERRED EMBODIMENT

Figure 1:
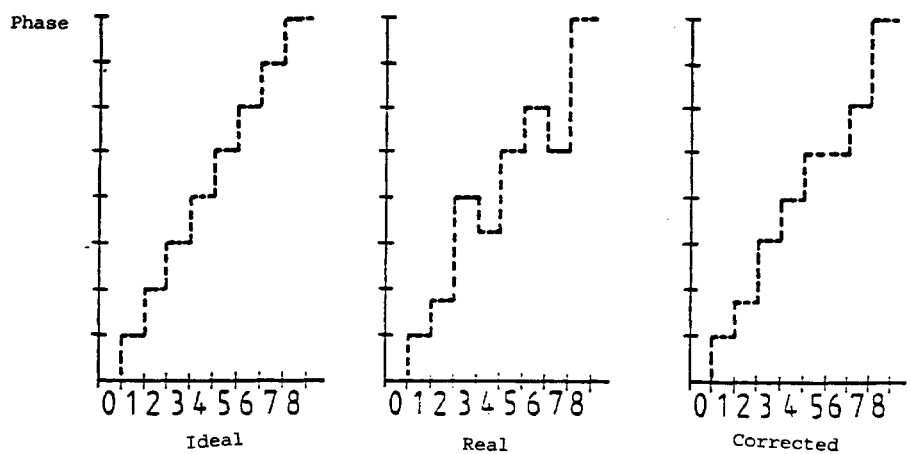
FIG. 1 illustrates three digital drive signal ramps for actuating a digital phase modulators having individual binary components.

Signal diagrams in FIG. 1 illustrate the example of the effect of manufacturing or other defects on one or more electrodes of an 8-bit resolution digital phase modulator. The corresponding inaccuracy is only noticeable when one or more defective electrode is activated.

The left-hand diagram of FIG. 1 illustrates the ideal staircase function (digital signal ramp) that results when all electrodes are of precisely the prescribed size and desired function. The middle diagram illustrates a real function, revealing defects at some of the binary-weighted electrodes. Finally, the right-hand diagram reveals a drive function, corrected in accordance with the invention, for preprogrammed, possibly changeable memory values, for the digital phase modulator. This may be achieved by monitoring the drive lines assigned to the individual electrodes and adding a corresponding correction value to the binary-weighted signals applied to them.

Figure 2:
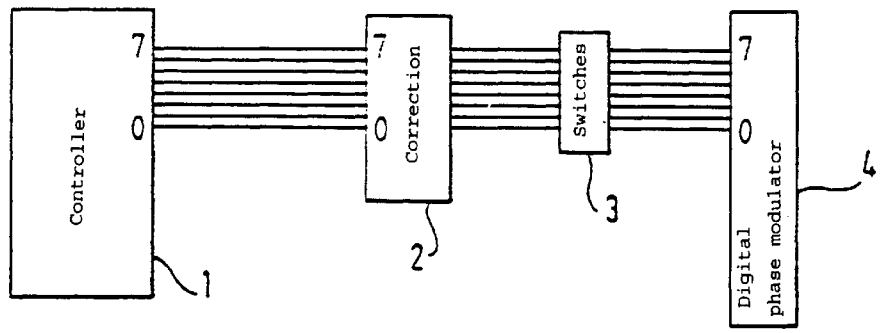
FIG. 2 is a block diagram of an arrangement for electronic correction of the individual binary signals that are applied to the binary-weighted electrodes of the phase modulator.

FIG. 2 is a block diagram that illustrates an 8-bit digital phase modulator 4 with an assigned drive circuit having, as essential modules, a controller 1 (control unit), a correction unit or table 2 and a switch group 3. In accordance with a first embodiment of the invention, direct correction of the binary drive signals supplied by the controller 1 is obtained by use of a table containing $2^n$ values of n-bit word width (e.g., n=8). The binary values supplied by the controller 1 pass as index input into the correction table 2. A newly assembled combination of the binary drive signals appears at the output of the table 2 and applied to the individual electrodes of the phase modulator with an appropriately corrected weighting.

Various types of electronic memory may be employed as a linearization or correction table (e.g., ROMs, EPROMs, EEPROMs etc.) to compensate aging caused by production, or inaccuracies in the phase modulator electrodes due to other causes.

Figure 3:
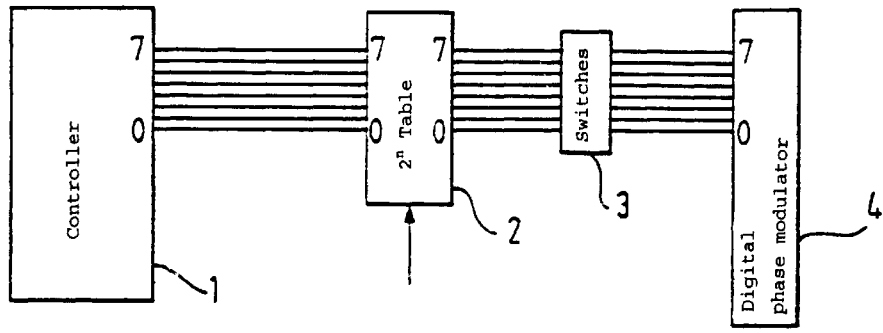
FIG. 3 is a block diagram, corresponding generally to the prior figure, of apparatus that includes an external adjustment of a correction value table capability.

The block diagram of FIG. 3 illustrates how the correction table 2 of $2^n$ values can be corrected or adjusted by an external input to compensate subsequent defects due to changes caused by aging, temperature changes or other influences on the generation of a desired phase shift by the electrodes. The externally accessible control input on the correction unit or table 2 is marked by an arrow.

The digital compensation of defects of the phase modulator can be represented by the following mathematical model. An ideal phase modulator with n-bit resolution can be described by the function $$\Psi = \Sigma^{n-1} c_i a_i,$$

in which $\psi$ it specifies the phase modulator value, $c_i$ specifies coefficients in the form of $k.2^i$, and $a_i$ assumes one of the values $\{0.1\}$.

To the extent that the electrodes may have defects, the real modulation value that can be generated by them will deviate from the respective ideal value. If such a deviation is denoted by an error term $e_i$, the actual phase modulation can be reproduced by $$\Psi = k\Sigma^{n-1} (2^i - e_i) a_i.$$

The above equation can be rewritten as $$\Psi = k\Sigma^{n-1} 2^i a_i - k\Sigma 0^{n-1} e_i a_i.$$

The error can therefore be compensated by adding the second term of the last equation to the modulator input value.

To implement such correction values, the signals applied to the control lines to the digital phase modulator 4 are modified between the digital controller output and the inputs to the phase modulator 4. In particular, they are modified by a calculated error, corresponding to the inaccuracy, as a function of the respectively activated electrodes.

In conjunction with FIG. 5, FIG. 4 illustrates a design that can be implemented in practice with the correction table 2 and an adder 5 constructed as an adder tree. The deviation from the ideal value is stored for each electrode in the correction value table 2. It is possible for a correction value to be generated for each case via the adder 5 to compensate phase modulator inaccuracies.

As FIG. 5 illustrates, the binary values that eventually determine the status of a relevant i-th control line, are used as correction values that are added at a specific time to the ideal values supplied by the controller 1. This solution requires a table of n elements that specifies the correction value for the relevant electrode.

In an alternative embodiment, illustrated in FIG. 6, use is made of the correction method of the invention by employing a type of trimming to increase the accuracy of a digital phase modulator (of comparatively low resolution) considerably. The illustrated example shows a digital 8-bit phase modulator that is enhanced to a resolution of 11 bits by using a 4-bit digital-to-analog converter. It may be seen that an analog signal generated by one of the four LSB bits of the controller 1 is applied, if appropriate, after correction via the memory table 2, to the least significant electrode.

Figure 7:
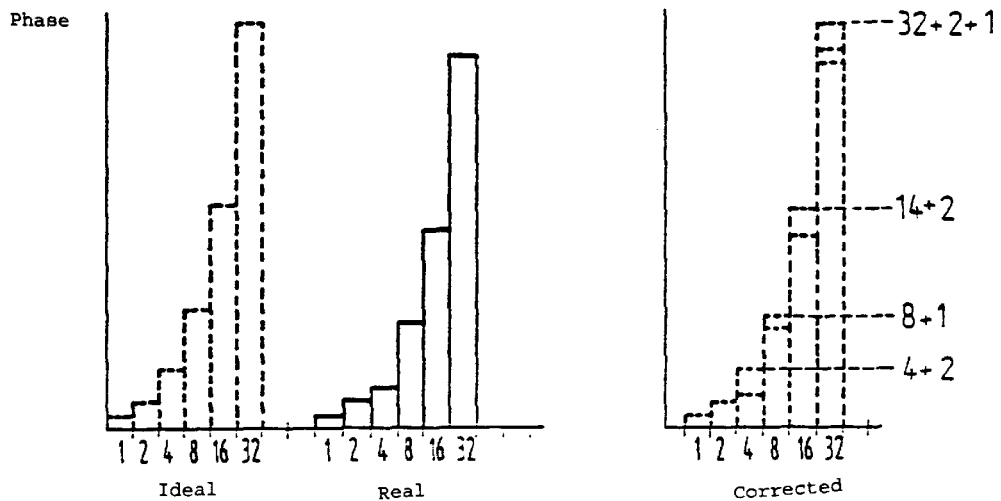
FIG. 7 illustrates the correction function for an arrangement according to the previous figure employing a 2 bit digital-to-analog converter whose output signal is applied to a specific electrode of the digital phase modulator.

FIG. 7 illustrates how an appropriate correction can be performed by using a 2-bit digital-to-analog converter for immediate error correction. The left-hand diagram of FIG. 7 illustrates both (1) the ideal absolute values of the individual electrodes and the ideal drive signals supplied by the controller 1 and (2) a real situation. The right-hand diagram of FIG. 7 illustrates the supplementary correction using the 4-bit signal, fed through the digital-to-analog converter 6 to the LSB electrode of the digital phase modulator as an analog value and corrected, from the controller 1, as illustrated, referred to the four least significant bits.

Figure 8:
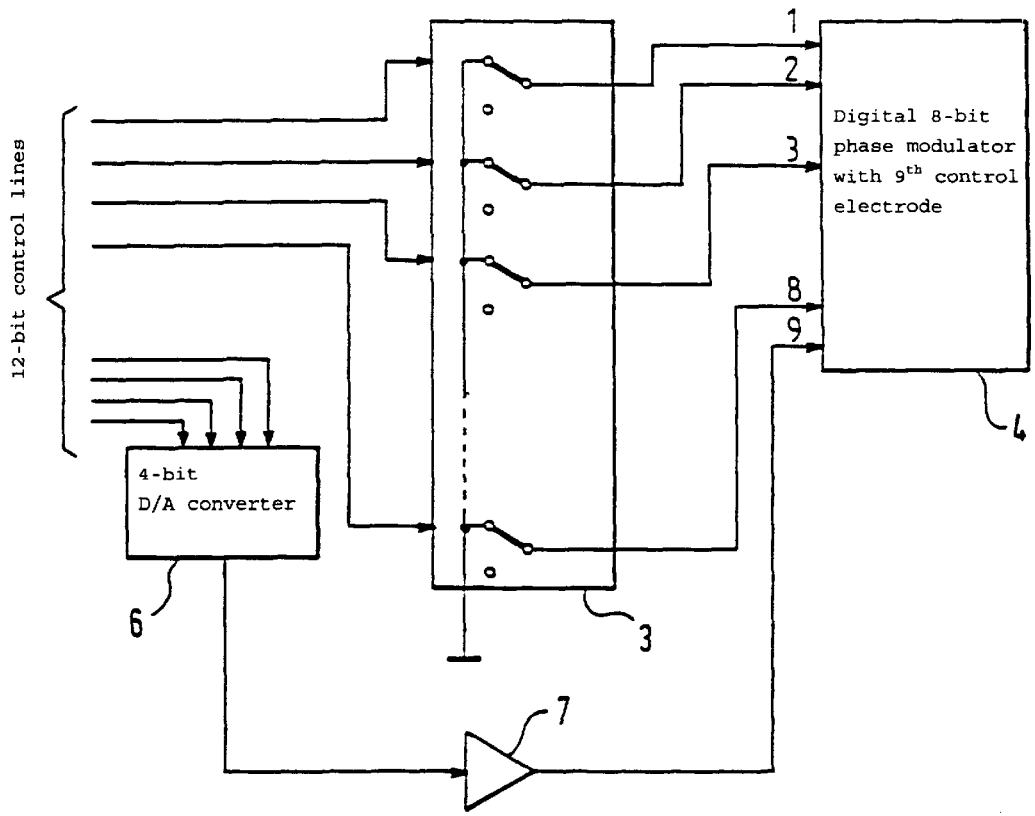
FIG. 8 illustrates an embodiment for a hybrid digital phase modulator driven both digitally and analog.

FIG. 8 illustrates a further important practical embodiment of the invention. A digital 8-bit phase modulator is supplemented by a ninth separate control electrode to form a combined digital-analog phase modulator for hybrid drive operation. As a result, it is possible to achieve substantially upgraded resolution without appreciably increasing the outlay of a phase modulator module. For the additional digital-to-analog converter 6 employed, a resolution of 4 bits is sufficient to achieve an equivalent drive of 12-bit resolution at the phase modulator 4.

The block diagram of FIG. 8 illustrates the concept of a phase modulator 4 in which appropriate digital signals are directly applied (possibly after compensation correction as described above) to the appropriately binary-weighted electrodes assigned to the lines 1 to 8. An additional electrode, connected to the ninth input of the phase modulator 4, is provided for driving by a signal generated by one of the four less significant bits (LSB bits) from the controller 1 via the digital-to-analog converter 6 and by an assigned driver amplifier 7. In this case, the binary signals applied to the input lines 1 to 8 can be modified as described above (e.g., using an EEPROM memory) to compensate deviations of the individual electrodes from the intended binary-weighting by means of the corresponding drive signal.

The proposal for implementing the invention illustrated in FIG. 8 can also clearly be applied to other binary number combinations both in the case of the number of electrodes of the phase modulator 4 and in the case of the resolution of the binary signal supplied by the controller 1.

While this invention has been described with reference to its presently-preferred embodiment, it is not limited thereto. Rather, the invention is limited only insofar as it is defined by the following set of patent claims and includes within its scope all equivalents thereof.

What is claimed is:

1. A method for increasing the accuracy of a digital phase modulator, within a fiber optic signal transmitting or measuring device, of the type that includes binary-weighted electrodes, said method comprising the steps of:
    a) storing correction values, assigned individually to the electrodes of the phase modulator in a memory table; and then
    b) correcting an electrode drive signal upon activation of the phase modulator in accordance with the stored correction values to activate the electrode.

2. A method as defined in claim 1 further including the steps of:
    a) converting the correction values for the electrodes to be activated for driving the phase modulator into a corrected electrode drive signal with the aid of correction values, computed for each electrode to be activated and stored in the memory table by logical combination with a prescribed electrode drive signal determined for the relevant driving; and then b) connecting said corrected drive signals in bit-parallel fashion to said electrodes.

3. A method as defined in claim 1 further including the step of modifying the correction values stored inside the memory table to take account of operationally induced or age-induced changes in the electric properties of the digital electrodes of the phase modulator.

4. A method as defined in claim 1 wherein the correction values for the electrodes to be activated for each driving of the phase modulator are subjected to digital-to-analog conversion and applied as an analog correction value to a separate electrode of the phase modulator.

5. A method for increasing the resolution of a digital phase modulator in a fiber optic signal transmitting or measuring device, said modulator having n binary-weighted electrodes, comprising the steps of:

a) subjecting a less significant component m of a digital drive signal, generated in said signal transmitting or measuring device, comprising (n+m) bits for the phase modulator, to digital-to-analog conversion; and then b) inputting said analog signal to a further separate electrode of the phase modulator.

6. A method as defined in claim 5 further including the steps of:

a) logically combining correction values with the less significant component m of the drive signal (m+n); then b) subjecting the digital signal obtained to digital-to-analog conversion; and then c) inputting said converted signal as an analog value to a further separate electrode of the phase modulator.

7. Apparatus for increasing the accuracy of a digital phase modulator of a fiber optic signal transmitting or measuring device, said modulator being of the type that includes binary-weighted electrodes, comprising, in combination:

a) a digital control unit for providing a digital electrode drive signal corresponding to a desired modulation value at the phase modulator;

b) a tabular memory for containing correction values to be assigned to individual electrodes of the phase modulator; and c) a switching device through which said correction values can be switched as a linearized, corrected digital excitation signal to the respective electrodes to be activated, in a fashion typical of being activated by the control unit in accordance with a respective electrode drive signal and logically combined with the electrode drive signal.

8. Apparatus as defined in claim 7 wherein said tabular memory is a ROM.

9. Apparatus as defined in claim 7 wherein said tabular memory is a PROM.

10. Apparatus as defined in claim 7 wherein said tabular memory is an EPROM.

11. Apparatus as defined in claim 7 wherein said tabular memory is an EEPROM.

12. Apparatus as defined in claim 7 further including:

a) a digital-to-analog converter; and b) said digital-to-analog converter is arranged so that the correction values determined for each driving of the phase modulator can be fed at an input side and an output side is connected to the separate electrode of the phase modulator to which the analog correction signal is to be applied.

13. Apparatus as defined in claim 7 further including:

a) a digital control unit for providing the digital drive signal for the phase modulator with a word length of (n+m) bits;

b) a digital-to-analog converter having an input side for receiving the less significant component m of the drive signal and an output side which is connected to the separate electrode of the phase modulator; and c) a switching device for connecting the more significant component n of the corrected drive signal to the corresponding electrodes of the digital phase modulator.

* * * * *